United States Patent
Kurakane et al.

(10) Patent No.: US 10,535,893 B2
(45) Date of Patent: Jan. 14, 2020

(54) NONAQUEOUS ELECTROLYTE SECONDARY BATTERY INSULATING POROUS LAYER

(71) Applicant: Sumitomo Chemical Company, Limited, Chuo-ku, Osaka (JP)

(72) Inventors: Kosuke Kurakane, Osaka (JP); Ichiro Arise, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/965,648

(22) Filed: Apr. 27, 2018

(65) Prior Publication Data
US 2018/0316053 A1 Nov. 1, 2018

(30) Foreign Application Priority Data
Apr. 28, 2017 (JP) .................... 2017-089473

(51) Int. Cl.
*H01M 10/0525* (2010.01)
*H01M 4/62* (2006.01)
(Continued)

(52) U.S. Cl.
CPC ......... *H01M 10/0525* (2013.01); *H01M 2/14* (2013.01); *H01M 4/133* (2013.01);
(Continued)

(58) Field of Classification Search
CPC .. H01M 2/166; H01M 2/1686; H01M 2/1613; H01M 4/62
See application file for complete search history.

(56) References Cited

U.S. PATENT DOCUMENTS

2008/0038639 A1* 2/2008 Ohata ................ H01M 4/13
429/231.95
2009/0200509 A1 8/2009 Suzuki et al.
(Continued)

FOREIGN PATENT DOCUMENTS

CN 106505174 A 3/2017
JP H09161778 A 6/1997
(Continued)

OTHER PUBLICATIONS

Office Action dated May 15, 2018 in KR Application No. 10-2018-0047702.
(Continued)

*Primary Examiner* — Imran Akram
(74) *Attorney, Agent, or Firm* — Panitch Schwarze Belisario & Nadel LLP

(57) ABSTRACT

An insulating porous layer for a nonaqueous electrolyte secondary battery having excellent separator resistance is provided. The porous layer contains an inorganic filler and a resin, a central particle diameter of the inorganic filler is in a range of 0.1 μm to 11 μm, a BET specific surface area per unit area of the inorganic filler is not greater than 100 m²/g, and the value of formula (1) is in a range of 0.10 to 0.40:

$$[1-T/M] \qquad (1)$$

In formula (1), T and M respectively represent a distance by which the insulating porous layer moves in a traverse direction or a machine direction from a starting point of measurement to a point where a critical load is obtained in a scratch test under a constant load of 0.1 N.

9 Claims, 2 Drawing Sheets

(51) Int. Cl.
    *H01M 4/133*    (2010.01)
    *H01M 4/66*     (2006.01)
    *H01M 2/14*     (2006.01)
    *H01M 10/0569*  (2010.01)
    *H01M 4/134*    (2010.01)
    *H01M 4/02*     (2006.01)

(52) U.S. Cl.
    CPC .............. *H01M 4/134* (2013.01); *H01M 4/62* (2013.01); *H01M 4/661* (2013.01); *H01M 10/0569* (2013.01); *H01M 2004/027* (2013.01); *H01M 2004/028* (2013.01)

(56) References Cited

U.S. PATENT DOCUMENTS

| | | | |
|---|---|---|---|
| 2011/0039145 A1 | 2/2011 | Abe et al. | |
| 2012/0288751 A1* | 11/2012 | Kako | H01M 2/166 429/188 |
| 2015/0050545 A1 | 2/2015 | Murata et al. | |
| 2016/0372730 A1 | 12/2016 | Uchida et al. | |
| 2017/0155112 A1 | 6/2017 | Ozeki | |
| 2017/0155114 A1 | 6/2017 | Kurakane | |
| 2017/0162849 A1 | 6/2017 | Murakami et al. | |
| 2017/0194612 A1 | 7/2017 | Murata et al. | |
| 2017/0194613 A1 | 7/2017 | Murata et al. | |
| 2017/0365832 A1 | 12/2017 | Ogata et al. | |
| 2018/0261815 A1* | 9/2018 | Ikemi | H01M 4/622 |

FOREIGN PATENT DOCUMENTS

| | | |
|---|---|---|
| JP | 2008004438 A | 1/2008 |
| JP | 5470751 B2 | 4/2014 |
| KR | 20100135955 A | 12/2010 |
| KR | 20160013941 A | 2/2016 |
| KR | 20160094846 A | 8/2016 |
| KR | 20170034946 A | 3/2017 |
| KR | 20170063369 A | 6/2017 |
| KR | 20170143426 A | 12/2017 |
| KR | 20180030666 A | 3/2018 |

OTHER PUBLICATIONS

Office Action dated Jan. 29, 2019 in JP Application No. 2018-082392 (Partial Translation).
Office Action dated Apr. 2, 2019 in CN Application No. 201810378948.9.

\* cited by examiner

FIG. 1

PICTURE OF DEGREE OF ORIENTATION

NONAQUEOUS ELECTROLYTE SECONDARY BATTERY INSULATING POROUS LAYER

This Nonprovisional application claims priority under 35 U.S.C. § 119 on Patent Application No. 2017-089473 filed in Japan on Apr. 28, 2017, the entire contents of which are hereby incorporated by reference.

TECHNICAL FIELD

The present invention relates to an insulating porous layer for a nonaqueous electrolyte secondary battery (hereinafter referred to as a "nonaqueous electrolyte secondary battery insulating porous layer"). The present invention also relates to (i) a laminated separator for a nonaqueous electrolyte secondary battery (hereinafter referred to as a "nonaqueous electrolyte secondary battery laminated separator"), (ii) a member for a nonaqueous electrolyte secondary battery (hereinafter referred to as a "nonaqueous electrolyte secondary battery member"), and (iii) a nonaqueous electrolyte secondary battery, each of which includes the nonaqueous electrolyte secondary battery insulating porous layer.

BACKGROUND ART

Nonaqueous electrolyte secondary batteries such as a lithium secondary battery are currently in wide use as batteries for devices such as a personal computer, a mobile telephone, and a portable information terminal.

A device equipped with a lithium ion battery includes a wide variety of electrical protection circuits, provided in a battery charger or a battery pack, so that the battery operates normally and safely. However, if a breakdown or a malfunction, for example, occurs in the protection circuits, the lithium ion battery may be continuously recharged. This may cause oxidative and reductive degradation of an electrolyte on surfaces of a positive electrode and a negative electrode both of which generate heat, oxygen release caused by decomposition of a positive electrode active material, and even deposition of metallic lithium on the negative electrode. This may eventually cause the lithium ion battery to fall into a thermal runaway. There is also a danger that ignition or burst may occur in the lithium ion battery, depending on the situation.

In order to safely stop a battery before such a dangerous thermal runaway occurs, most lithium ion batteries currently include, as a separator, a porous base material which contains a polyolefin as a main component and which has a shutdown function of clogging pores present in the porous base material when a temperature inside the battery is raised due to some defect and reaches approximately 130° C. to 140° C.

Meanwhile, a porous base material which contains a polyolefin as a main component melts when the porous base material is exposed to a temperature equal to or higher than a temperature at which the shutdown function works. This is because heat resistance of such a porous base material is low. This may cause a short circuit inside a battery and may consequently lead to ignition or explosion of the battery. In view of the above, with an aim to improve the heat resistance of the porous base material, efforts are being made to develop a separator that includes a porous layer containing a filler and a resin on at least one surface of the porous base material.

One examples of such a separator is a separator for a battery (hereinafter, referred to as a "battery separator") disclosed in Patent Literature 1. The battery separator is arranged to include a porous layer containing boehmite (plate-shaped particles) as fine particles.

CITATION LIST

Patent Literature

[Patent Literature 1] Japanese Patent Application Publication, Tokukai, No. 2008-4438 (Publication Date: Jan. 10, 2008)

SUMMARY OF INVENTION

Technical Problem

However, a nonaqueous electrolyte secondary battery including the battery separator disclosed in Patent Literature 1, in general, did not have a separator resistance that was sufficiently and satisfactorily low. On this account, there have been demands for development of a nonaqueous electrolyte secondary battery whose separator resistance is low.

Solution to Problem

As a result of diligent studies made by the inventors of the present invention, the inventors have found that a nonaqueous electrolyte secondary battery has a lower separator resistance when the nonaqueous electrolyte secondary battery includes, as a separator or a separator member, a porous layer arranged such that: (i) the porous layer contains an inorganic filler and a resin; (ii) a ratio of a transverse direction-critical load distance (T) measured in a scratch test to a machine direction-critical load distance (M) measured in a scratch test falls within a specific range; and (iii) a central particle diameter and a BET specific surface area per unit area of the inorganic filler are in specific ranges, respectively. Consequently, the inventors have accomplished the present invention.

An embodiment of the present invention encompasses any of aspects described in the following [1] to [6].

[1] A nonaqueous electrolyte secondary battery insulating porous layer containing an inorganic filler and a resin, wherein:

a central particle diameter of the inorganic filler is in a range of 0.1 µm to 11 µm;

a BET specific surface area per unit area of the inorganic filler is not greater than 100 m$^2$/g; and a value expressed by the following formula (1) is in a range of 0.10 to 0.40:

$$|1-T/M| \tag{1}$$

where (i) T represents a distance by which the nonaqueous electrolyte secondary battery insulating porous layer moves in a traverse direction from a starting point of measurement to a point where a critical load is obtained in a scratch test under a constant load of 0.1 N and (ii) M represents a distance by which the nonaqueous electrolyte secondary battery insulating porous layer moves in a machine direction from a starting point of measurement to a point where a critical load is obtained in the scratch test under the constant load of 0.1 N.

[2] The nonaqueous electrolyte secondary battery insulating porous layer according to [1], wherein:

a value expressed by the following formula (2) is in a range of 0.10 to 0.40:

$$1-T/M \tag{2}$$

where (i) T represents a distance by which the nonaqueous electrolyte secondary battery insulating porous layer moves in the traverse direction from a starting point of measurement to a point where a critical load is obtained in a scratch test under a constant load of 0.1 N and (ii) M represents a distance by which the nonaqueous electrolyte secondary battery insulating porous layer moves in the machine direction from a starting point of measurement to a point where a critical load is obtained in the scratch test under the constant load of 0.1 N.

[3] The nonaqueous electrolyte secondary battery insulating porous layer according to [1] or [2], wherein:
the inorganic filler contains alumina and a plate-shaped filler.

[4] A nonaqueous electrolyte secondary battery laminated separator including:
a porous base material containing a polyolefin as a main component; and
a nonaqueous electrolyte secondary battery insulating porous layer described in any one of [1] to [3], the nonaqueous electrolyte secondary battery insulating porous layer being provided on one surface or both surfaces of the porous base material.

[5] A nonaqueous electrolyte secondary battery member including:
a positive electrode;
a nonaqueous electrolyte secondary battery insulating porous layer described in any one of [1] to [3] or a nonaqueous electrolyte secondary battery laminated separator described in [4]; and
a negative electrode,
the positive electrode, the nonaqueous electrolyte secondary battery insulating porous layer or the nonaqueous electrolyte secondary battery laminated separator, and the negative electrode being provided in this order.

[6] A nonaqueous electrolyte secondary battery including:
a nonaqueous electrolyte secondary battery insulating porous layer described in any one of [1] to [3] or a nonaqueous electrolyte secondary battery laminated separator described in [4].

Advantageous Effects of Invention

The nonaqueous electrolyte secondary battery insulating porous layer in accordance with an embodiment of the present invention advantageously allows a nonaqueous electrolyte secondary battery including the nonaqueous electrolyte secondary battery insulating porous layer to have a lower separator resistance.

DESCRIPTION OF EMBODIMENTS

The following description will discuss an embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. In the present specification, any numerical range expressed as "A to B" means "not less than A and not greater than B" unless otherwise stated.

Embodiment 1: Nonaqueous Electrolyte Secondary Battery Insulating Porous Layer

A nonaqueous electrolyte secondary battery insulating porous layer (hereinafter, also referred to as simply a "porous layer") in accordance with Embodiment 1 of the present invention is a nonaqueous electrolyte secondary battery insulating porous layer containing an inorganic filler and a resin, wherein: a central particle diameter of the inorganic filler is in a range of 0.1 μm to 11 μm; a BET specific surface area of the inorganic filler per unit area is not greater than 100 m$^2$/g; and a value expressed by each of the following formulae (1) and (2) is in a range of 0.10 to 0.40:

$$|1-T/M| \qquad (1)$$

$$1-T/M \qquad (2)$$

where (i) T represents a distance by which the nonaqueous electrolyte secondary battery insulating porous layer moves in a traverse direction (hereinafter, also referred to as a "TD") from a starting point of measurement to a point where a critical load is obtained in a scratch test under a constant load of 0.1 N and (ii) M represents a distance by which the nonaqueous electrolyte secondary battery insulating porous layer moves in a machine direction (hereinafter, also referred to as an "MD") from a starting point of measurement to a point where a critical load is obtained in the scratch test under the constant load of 0.1 N (hereinafter, the above distances each may be also referred to as a "critical load distance").

The nonaqueous electrolyte secondary battery insulating porous layer in accordance with an embodiment of the present invention can be used as a constituent member of a nonaqueous electrolyte secondary battery, and preferably as a constituent member of a nonaqueous electrolyte secondary battery laminated separator (described later) in accordance with an embodiment of the present invention. Specifically, the nonaqueous electrolyte secondary battery insulating porous layer in accordance with an embodiment of the present invention can constitute a nonaqueous electrolyte secondary battery laminated separator in accordance with an embodiment of the present invention when the nonaqueous electrolyte secondary battery insulating porous layer is provided on one surface or both surfaces of a porous base material containing a polyolefin as a main component.

Figure 1:
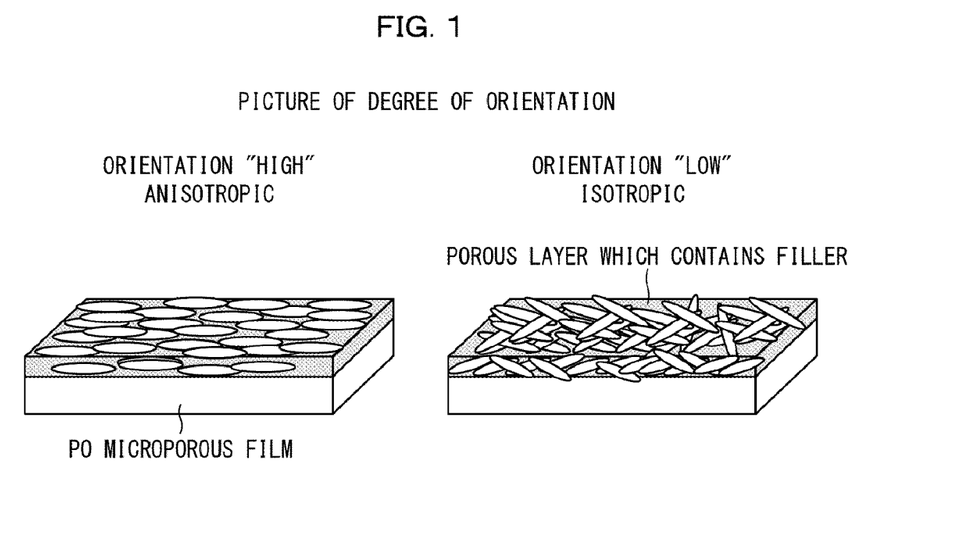
FIG. 1 is a schematic view illustrating respective structures of a porous layer containing an inorganic filler in a case where the inorganic filler is in a high orientation state (left) and in a case where the inorganic filler is in a low orientation state (right).

A ratio of a TD critical load distance (T) measured in a scratch test to an MD critical load distance (M) measured in the scratch test (hereinafter, also referred to as simply "Formulae (1) or (2)) is an indicator of an orientation state of the inorganic filler in the porous layer. FIG. 1 is a schematic view showing respective states of the inorganic filler in the porous layer in a case where the inorganic filler is in a high orientation state (anisotropic) and in a case where the inorganic filler is in a low orientation state (isotropic). FIG. 1 shows (i) on the left, a view schematically illustrating a structure of the porous layer in a case where the inorganic filler in the porous layer is in a high orientation state and accordingly anisotropic and (ii) on the left, a view schematically illustrating a structure of the porous layer in a case where the inorganic filler in the porous layer is in a low orientation state and accordingly isotropic.

The porous layer in accordance with an embodiment of the present invention contains an inorganic filler and a resin. The porous layer has a structure in which many pores, connected to one another, are provided. Accordingly, the porous layer is a layer through which a gas or a liquid can pass from one surface to the other. Further, in a case where the porous layer in accordance with an embodiment of the present invention is used as a constituent member of a nonaqueous electrolyte secondary battery laminated separator, the porous layer can be a layer which, serving as an outermost layer of the laminated separator, comes in contact with an electrode.

It is preferable that the resin contained in porous layer in accordance with an embodiment of the present invention be insoluble in an electrolyte of a battery and be electrochemically stable when the battery is in normal use. Concrete examples of the resin encompass: polyolefins such as polyethylene, polypropylene, polybutene, and an ethylene-propylene copolymer; fluorine-containing resins such as polyvinylidene fluoride (PVDF) and polytetrafluoroethylene; fluorine-containing rubbers such as a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoro ethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer; aromatic polyamides; wholly aromatic polyamides (aramid resin); rubbers such as a styrene-butadiene copolymer and a hydride thereof, a methacrylic acid ester copolymer, an acrylonitrile-acrylic acid ester copolymer, a styrene-acrylic acid ester copolymer, ethylene propylene rubber, and polyvinyl acetate; resins with a melting point or glass transition temperature of not lower than 180° C. such as polyphenylene ether, polysulfone, polyether sulfone, polyphenylene sulfide, polyetherimide, polyamide imide, polyether amide, and polyester; and water-soluble polymers such as polyvinyl alcohol, polyethylene glycol, cellulose ether, sodium alginate, polyacrylic acid, polyacrylamide, and polymethacrylic acid.

Also, it is possible to suitably use a water-insoluble polymer as the resin contained in the porous layer in accordance with an embodiment of the present invention. In other words, the porous layer in accordance with an embodiment of the present invention containing such a water-insoluble polymer (e.g., acrylate resin) as the resin is produced preferably with the use of an emulsion obtained by dispersing the water-insoluble polymer in an aqueous solvent.

Note that the water-insoluble polymer herein means a polymer that does not dissolve in an aqueous solvent but becomes particles so as to be dispersed in an aqueous solvent. The definition of the term "water-insoluble polymer" is not clear. For example, the International Publication No. WO 2013/031690 defines the expression "a polymer is water-insoluble". According to the International Publication No. WO 2013/031690, the expression "a polymer is water-insoluble" means that in a case where 0.5 g of the polymer is dissolved in 100 g of water at 25° C., an insoluble content of the polymer is not less than 90% by weight. In contrast, according to the definition of the expression "a polymer is water-soluble" in the above International Publication, the expression "a polymer is water-soluble" means that in a case in where 0.5 g of the polymer is dissolved in 100 g of water at 25° C., an insoluble content of the polymer is less than 0.5% by weight. The shape of the particles of the water-insoluble polymer is not limited to any particular one, but is preferably a spherical shape.

The water-insoluble polymer, which is polymer particles, is produced by, for example, polymerizing, in an aqueous solvent, a monomer composition containing a monomer (described later).

Examples of the monomer constituting the water-insoluble polymer encompass styrene, vinyl ketone, acrylonitrile, methyl methacrylate, ethyl methacrylate, glycidyl methacrylate, glycidyl acrylate, methyl acrylate, ethyl acrylate, and butyl acrylate.

Examples of the polymer also encompass, in addition to a homopolymer of the monomer, a copolymer of two or more kinds of monomers. Examples of the copolymer encompass: fluorine-containing resins such as polytetrafluoroethylene, a tetrafluoroethylene-hexafluoropropylene copolymer, an ethylene-tetrafluoroethylene copolymer, and polyvinylidene fluoride; melamine resin; urea resin; polyethylene; polypropylene; polyacrylic acid; and polymethacrylic acid.

The aqueous solvent is not limited to any particular one, provided that the water-insoluble polymer particles can be dispersed in the aqueous solvent. Examples of the aqueous solvent encompass: water; ketones such as diacetone alcohol and γ-butyrolactone; alcohols such as ethyl alcohol, isopropyl alcohol and n-propyl alcohol; glycol ethers such as propylene glycol monomethyl ether, methyl cellosolve, ethyl cellosolve, ethylene glycol tertiary butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolan, 1,4-dioxolan, and tetrahydrofuran. Among these aqueous solvents, water is particularly preferable, since water is nonflammable and a dispersion of particles of a binder can be easily obtained with the use of water. While water is used as a main solvent, any of the above aqueous solvents that is not water may be mixed and used with water. In this case, an amount of such a water-insoluble polymer that is not water is in a range that can ensure a dispersed state of particles of the water-insoluble polymer as the resin.

Note that the porous layer in accordance with an embodiment of the present invention may contain a single kind of resin or may alternatively contain a mixture of two or more kinds of resins.

Further, concrete examples of the aromatic polyamides encompass poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among these aromatic polyamides, poly(paraphenylene terephthalamide) is more preferable.

Among the above resins, a polyolefin, a fluorine-containing resin, an aromatic polyamide, a water-soluble polymer, or the water-insoluble polymer in the form of particles dispersed in the aqueous solvent is more preferable. Among these resins, in a case where the porous layer is arranged so as to face a positive electrode, a fluorine-containing resin or fluorine-containing rubber is still more preferable, and a polyvinylidene fluoride-based resin is particularly preferable. This is because such a resin makes it easy to maintain various properties, such as a rate characteristic and a resistance characteristic, of a nonaqueous electrolyte secondary battery even in a case where the nonaqueous electrolyte secondary battery suffers oxidation degradation during operation of the nonaqueous electrolyte secondary battery. Examples of the polyvinylidene fluoride-based resin encompass: a homopolymer of vinylidene fluoride (that is, polyvinylidene fluoride); and a copolymer of vinylidene fluoride and any of hexafluoropropylene, tetrafluoroethylene, trifluoroethylene, trichloroethylene, vinyl fluoride and the like. Further, the water-soluble polymer or the water-insoluble polymer in the form of particles dispersed in the aqueous solvent is more preferable in view of a process and an environmental load, because water can be used as a solvent to form the porous layer. The water-soluble polymer is particularly preferably cellulose ether or sodium alginate, and particularly preferably cellulose ether.

Concrete examples of the cellulose ether encompass carboxymethyl cellulose (CMC), hydroxyethyl cellulose (HEC), carboxyethyl cellulose, methyl cellulose, ethyl cellulose, cyanoethyl cellulose, and oxyethyl cellulose. The cellulose ether is more preferably CMC or HEC, and particularly preferably CMC, because CMC and HEC less degrade in use over a long term and are excellent in chemical stability.

Further, regarding the water-insoluble polymer in the form of particles dispersed in the aqueous solvent, the aqueous solvent is preferably water.

A lower limit of a content of the resin in the porous layer in accordance with an embodiment of the present invention is preferably not less than 1% by weight, and more preferably not less than 2% by weight, with respect to a total weight of the porous layer. Meanwhile, an upper limit of the content of the resin in the porous layer in accordance with an embodiment of the present invention is preferably not greater than 50% by weight, and more preferably not greater than 30% by weight. It is preferable that a content of the PVDF-based resin be not less than 1% by weight, in view of improvement of cohesion of particles of a filler, in other words, in view of preventing the filler from falling out of the porous layer. It is preferable that the content of the PVDF-based resin be not greater than 50% by weight, in view of a battery characteristic (in particular, resistance to ion permeation) and heat resistance.

The porous layer in accordance with an embodiment of the present invention contains an inorganic filler. A lower limit of a content of the inorganic filler is preferably not less than 50% by weight, more preferably not less than 70% by weight, and still more preferably not less than 90% by weight, with respect to a total weight of the inorganic filler and the resin constituting the porous layer in accordance with an embodiment of the present invention. Meanwhile, an upper limit of the content of the inorganic filler in the porous layer in accordance with an embodiment of the present invention is preferably not greater than 99% by weight, and more preferably not greater than 98% by weight. In view of heat resistance, the content of the inorganic filler is preferably not less than 50% by weight. Meanwhile, in view of cohesion of particles of the inorganic filler, the content of the inorganic filler is preferably not greater than 99% by weight. Containing the inorganic filler allows a separator including the porous layer to have improved slidability and improved heat resistance. The inorganic filler is not limited to a particular one, provided that the inorganic filler is stable in a nonaqueous electrolyte and is also electrochemically stable. In view of ensuring safety of a battery, the inorganic filler is preferably a filler which has a heat-resistant temperature of not less than 150° C.

The inorganic filler is not limited to a particular one, and is typically an insulating filler. The inorganic filler is preferably an inorganic substance containing at least one metal element selected from the group consisting of aluminum, zinc, calcium, zirconium, silicon, magnesium, barium, and boron, and more preferably, an inorganic substance containing aluminum. Further, the inorganic filler preferably contains an oxide of the metal element.

More specifically, examples of the inorganic filler encompasses titanium oxide, alumina ($Al_2O_3$), zinc oxide (ZnO), calcium oxide (CaO), zirconium oxide ($ZrO_2$), silica, magnesia, barium oxide, boron oxide, mica, wollastonite, attapulgite, and boehmite (monohydrated alumina). The above inorganic fillers may be used alone or in combination of two or more thereof.

The inorganic filler contained in the porous layer in accordance with an embodiment of the present invention preferably contains alumina and a plate-shaped filler. The plate-shaped filler can be, for example, at least one filler selected from the group consisting of fillers respectively made of zinc oxide (ZnO), mica, and boehmite among the above metal oxides.

The inorganic filler preferably has a volume average particle diameter of 0.01 μm to 11 μm in view of (i) achievement of good adhesion and good slidability of the porous layer and (ii) formability of a laminated body. The lower limit of the volume average particle diameter is preferably not less than 0.05 μm and more preferably not less than 0.1 μm. Meanwhile, the upper limit of the volume average particle diameter is preferably not greater than 10 μm, more preferably not greater than 5 μm, and particularly preferably not greater than 1 μm.

The inorganic filler can be in any shape and is not limited to a particular shape. The filler may be, for example, a particulate filler. Example shapes of particles of the inorganic filler encompass: a spherical shape; an elliptical shape; a plate shape; a bar shape; a scale-like shape; an indefinite irregular shape; a fiber shape; and shapes, such as a peanut-like shape and/or a tetrapod-like shape, which are formed by thermal fusion bonding of individual particles. In view of prevention of the occurrence of a short circuit in the battery, the inorganic filler is made of preferably (i) plate-shaped particles and/or (ii) primary particles that have not aggregated. Further, in view of ion permeation, the inorganic filler is made of preferably particles having a shape which does not allow the particles to easily form close packing of the particles in the porous layer. Preferable examples of such a shape encompass: an indefinite irregular shape; a fiber shape; and a shape, such as a peanut-like shape and/or a tetrapod-like shape, which is obtained by thermal fusion bonding of individual particles. Among these shapes, particularly, the shape, such as a peanut-like shape and/or a tetrapod-like shape, which is obtained by thermal fusion bonding of individual particles, is more preferable.

The filler forms fine bumps on a surface of the porous layer, thereby improving the slidability. A filler including (i) plate-shaped particles and/or (ii) primary particles that have not aggregated forms finer bumps on the surface of the porous layer, so that the porous layer has better adhesion to an electrode.

Meanwhile, in the porous layer in accordance with an embodiment of the present invention, an atomic mass percentage of oxygen of the metal oxide contained in the inorganic filler is preferably 10% to 50%, and more preferably 20% to 50%. The term "atomic mass percentage of oxygen" in an embodiment of the present invention means a ratio, in percentage, of a mass of oxygen atoms in a metal oxide with respect to a total mass of the metal oxide. For example, in the case of zinc oxide, since the atomic mass of zinc is (65.4), the atomic mass of oxygen is (16.0), and accordingly the molecular mass of zinc oxide (ZnO) is 81.4 (=65.4+16.0), the atomic mass percentage of oxygen in zinc oxide is 16.0/81.4*100=20(%).

The atomic mass percentage of oxygen of the metal oxide in the above range keeps (i) suitable affinity between the inorganic filler and a solvent or a dispersion medium in a coating solution for use in a method (described later) of producing the porous layer and also (ii) a suitable distance between particles of the inorganic filler. This makes it possible to have a good dispersibility of the coating solution. This consequently makes it possible to control a value obtained by each of the above Formulae (1) and (2) in a suitable specified range. Therefore, the atomic mass percentage of oxygen of the metal oxide in the above range is preferable.

The porous layer in accordance with an embodiment of the present invention may contain a component other than the above-described inorganic filler and the resin. Examples of such a component encompass a surfactant, a wax, and a binder resin. A content of such a component is preferably 0% by weight to 50% by weight with respect to a total weight of the porous layer.

The porous layer in accordance with an embodiment of the present invention has an average thickness of preferably 0.5 μm to 10 μm, and more preferably 1 μm to 5 μm, per surface of the porous base material, in order to ensure (i) adhesion of the porous layer to an electrode and (ii) a high energy density.

The porous layer in accordance with an embodiment of the present invention preferably has a structure that is sufficiently porous, in view of ion permeability. Specifically, the porous layer preferably has a porosity of 30% to 60%. Further, the porous layer in accordance with an embodiment of the present invention has an average pore diameter of preferably 20 nm to 100 nm.

<T/M Ratio of Surface of Porous Layer>

The porous layer in accordance with an embodiment of the present invention has a value expressed by the following Formula (1), which value is in a range of preferably 0.10 to 0.40 and more preferably 0.10 to 0.30:

$$|1-T/M| \quad (1),$$

where (i) T represents a critical load distance in the TD in a scratch test under a constant load of 0.1 N and (ii) M represents a critical load distance in the MD in the scratch test under the constant load of 0.1 N.

Further, the porous layer in accordance with an embodiment of the present invention has a value expressed by the following Formula (2), which value is in a range of preferably 0.10 to 0.40 and more preferably 0.10 to 0.30:

$$1-T/M \quad (2),$$

where (i) T represents a critical load distance in the TD in a scratch test under a constant load of 0.1 N and (ii) M represents a critical load distance in the MD in the scratch test under the constant load of 0.1 N.

The value expressed by each of the Formulae (1) and (2) is a value which is derived from the critical load distances obtained in the scratch test and which indicates anisotropy of the structure of the porous layer. When the value is closer to zero, the structure of the porous layer is more isotropic in terms of the critical load distances.

Figure 2:
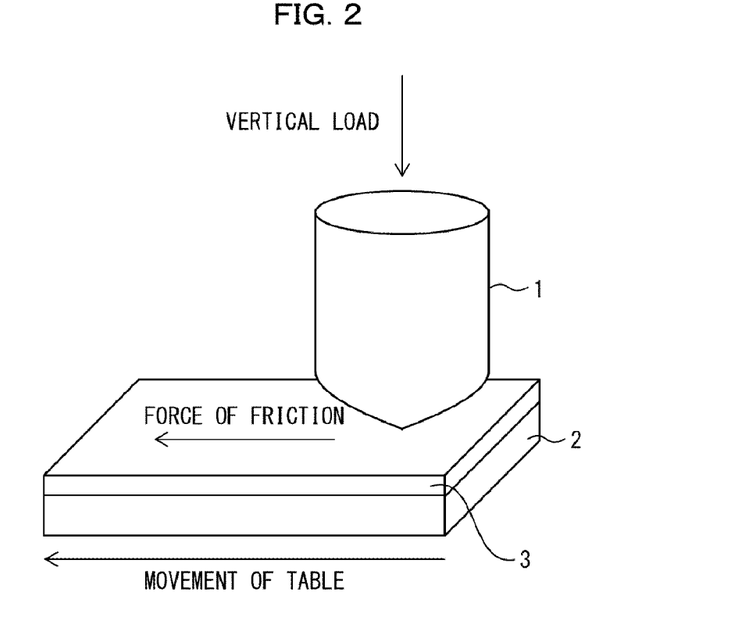
FIG. 2 is a view illustrating a device and an operation of the device in a scratch test.

The "scratch test" in accordance with an embodiment of the present invention is a test for measuring stress that occurs in a distance by which an indenter moves on the porous film in a case where, while a surface layer of the porous film is subjected to compressive deformation in a thickness direction by applying a constant load to the indenter (i.e. while the indenter is pressed against the surface layer of the porous film), the porous layer is moved in a horizontal direction (see FIG. 2). Specifically, the scratch test is carried out by a method including the following steps:

(1) A laminated porous film including a porous layer to be measured is cut into a piece of 20 mm×60 mm. Then, a preparation is made by combining the piece of the laminated porous film and a glass plate of 30 m×70 mm with the use of liquid glue. Then, the preparation is dried at a temperature of 25° C. for one whole day and night, so that a test sample is prepared. Note that the piece of the laminated porous film and the glass plate are to be combined with care so that no air bubble is made between the piece of the laminated porous film and the glass plate.

(2) The test sample prepared in the step (1) is placed on a microscratch testing device. Then, while a diamond indenter of the testing device is applying a vertical load of 0.1 N to the test sample, a table of the testing device is moved by a distance of 10 mm in a transverse direction (TD) of the laminated porous film at a speed of 5 mm/min. During the movement of the table, stress (force of friction) that occurs between the diamond indenter and the test sample is measured.

Figure 3:
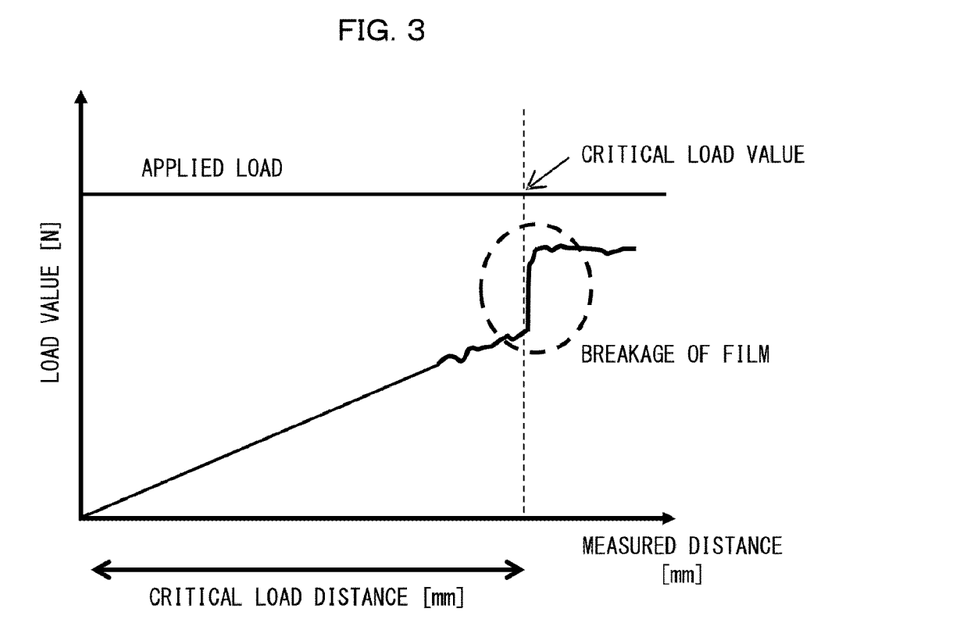
FIG. 3 is a graph which is prepared on the basis of results of a scratch test and which shows a relationship between a critical load value and a critical load distance.

(3) A curve graph is made, which shows a relationship between a displacement of the stress measured in the step (2) and the distance of the movement of the table. Then, based on the curve graph, the following are calculated as illustrated in FIG. 3: (i) a critical load value in the TD and (ii) a distance (critical load distance) in the TD between a starting point of measurement and a point where the critical load is obtained.

(4) The direction of the movement of the table is changed to a machine direction (MD), and the above steps (1) to (3) are repeated. Then, the following are calculated: (i) a critical load value in the MD and (ii) the distance (critical load distance) in the MD between a starting point of measurement and a point where the critical load is obtained.

Note that any conditions and the like for the measurement in the scratch test other than the conditions described above are similar to those described in JIS R 3255.

The critical load distance calculated in the scratch test serves as (a) an indicator of how easily a surface layer of a laminated porous film is plastically-deformed and (b) an indicator of how easily shearing stress is transferred to a surface opposite a measured surface. If a critical load distance is long, then it indicates that (a') a surface layer of a laminated porous film measured is unlikely to be plastically-deformed and (b') shearing stress is unlikely (difficult) to be transferred to a surface opposite a measured surface of the laminated porous film subjected to measurement.

Note that a critical load distance in a TD and a critical load distance in an MD are considered to be greatly affected by the following structural factors of a laminated porous film:

(i) a condition of orientation, in the MD, of molecules of a resin in the laminated porous film;
(ii) a condition of orientation, in the TD, of molecules of a resin in the laminated porous film; and
(iii) how the molecules of the resin aligned in the MD and the molecules of the resin aligned in the TD are in contact with each other along a thickness direction of the laminated porous film.

In a case where the value expressed by each of the above Formulae (1) and (2) is greater than 0.40, the internal structure of the porous layer is too anisotropic. This leads to a longer length of a flow path through which ions permeate the porous layer. This results in a larger resistance of the porous layer to ion permeation in a nonaqueous electrolyte secondary battery including such a porous layer, so that a separator resistance in the nonaqueous electrolyte secondary battery increases. In contrast, in a case where the value expressed by each of the above Formulae (1) and (2) is less than 0.10, the structure of the porous layer is considered to be too isotropic. In a case where the structure of the porous layer is too isotropic, the porous layer included in a nonaqueous electrolyte secondary battery tends to have an excessively large electrolyte receiving capacity during operation of the nonaqueous electrolyte secondary battery. Accordingly, a flow rate of an electrolyte in the whole of the nonaqueous electrolyte secondary battery is controlled by electrolyte supply capacities of (i) electrodes and (ii) a separator base material which are in contact with the porous layer and which supply an electrolyte to the porous layer. This consequently increases a separator resistance in such a nonaqueous electrolyte secondary battery.

<Central Particle Diameter>

Further, in the porous layer in accordance with an embodiment of the present invention, a central particle diameter of the inorganic filler is in a range of preferably 0.1 µm to 11 µm, more preferably 0.1 µm to 10 µm, still more preferably 0.1 µm to 5 µm, and particularly preferably 0.5 µm.

A method of measuring the central particle diameter of the inorganic filler is not limited to a particular one, and can be, for example, a method described in Examples.

In a case where the central particle diameter of the inorganic filler is larger than 11 µm, a thickness of a heat-resistant layer increases and becomes uneven. This causes ion permeation of a porous layer to be non-uniform. As a result, in a nonaqueous electrolyte secondary battery including such a porous layer, a separator resistance tends to increase. In contrast, in a case where the central particle diameter of the inorganic filler is less than 0.1 µm, a viscosity of a coating material increases. This may cause the coating material to exhibit dilatancy. This may consequently result in defective coating property and cause uneven coating of the coating material for formation of the porous layer. Furthermore, in this case, since the central particle diameter of the inorganic filler is small, an amount of a binder required for binding particles of the inorganic filler increases. This results in a larger resistance of the porous layer to ion permeation in a nonaqueous electrolyte secondary battery including the porous layer, so that a separator resistance in the nonaqueous electrolyte secondary battery increases.

<BET Specific Surface Area>

Further, the porous layer in accordance with an embodiment of the present invention has a BET specific surface area per unit area of the inorganic filler of not greater than 100 $m^2/g$, more preferably not greater than 50 $m^2/g$. The BET specific surface area per unit area of the inorganic filler may be not greater than 10 $m^2/g$.

A method of measuring the BET specific surface area per unit area of the inorganic filler is not limited to a particular one, and can be, for example, a method including the following steps (1) to (3) of:
(1) pretreating a filler by drying in a vacuum at 80° C. for 8 hours;
(2) obtaining a nitrogen adsorption-desorption isotherm by measurement according to a constant volume method; and
(3) calculating the specific surface area of the filler by a BET method.

Note that in measurement of the specific surface area of the filler, a device for pretreating the filler and a measurement device are each not limited to a particular one. For example, the device for pretreating the filler can be BEL-PREP-vacII (manufactured by MicrotracBEL Corp.) and the measurement device can be BELSORP-mini (manufactured by MicrotracBEL Corp.).

Further, conditions for the measurement of the specific surface area of the filler is not particularly limited, and can be set appropriately by a person skilled in the art.

In a case where the BET specific surface area per unit area of the inorganic filler is greater than 100 $m^2/g$, an oil content increases due to the filler. This accordingly deteriorates a property of the coating material of the porous layer and leads to a defective coating property. As a result, in a nonaqueous electrolyte secondary battery including such a porous layer, a separator resistance tends to increase.

<Method of Producing Porous Layer>

A method of producing a porous layer in accordance with an embodiment of the present invention is not limited to a particular one. The method can be, for example, a method according to which a porous layer containing the above-described inorganic filler and the above-described resin are formed on a base material by using any of the following processes (1) to (3). In a case where the following process (2) or (3) is used, a porous layer may be produced by drying a deposited porous layer for removal of a solvent. In a coating solution used in each of the processes (1) to (3), preferably, the inorganic filler is dispersed and the resin is dissolved. The base material is not limited to a particular one. The base material can be, for example, (i) a porous base material which contains a polyolefin as a main component and which serves as a porous base material of a nonaqueous electrolyte secondary battery laminated separator (described later) in accordance with an embodiment of the present invention or (ii) an electrode sheet.

(1) A process in which (i) a surface of a base material is coated with a coating solution, which is to form the porous layer and contains fine particles of the above-described inorganic filler and of the above-described resin, and then (ii) the surface of the base material is dried for removal of a solvent (dispersion medium) from the coating solution, so that the porous layer is formed.

(2) A process in which (i) a surface of the base material is coated with a coating solution, which is to form the porous layer and contains the above-described inorganic filler and the above-described resin, and then (ii) the base material is immersed into a deposition solvent (which is a poor solvent for the above resin) for deposition of the porous layer containing the inorganic filler and the resin.

(3) A process in which (i) a surface of the base material is coated with a coating solution, which is to form the porous layer and contains the above-described inorganic filler and the above-described resin, and then (ii) the coating solution is made acidic with use of a low-boiling-point organic acid for deposition of the porous layer containing the inorganic filler and the resin.

The solvent (dispersion medium) in the coating solution is not limited to a particular one. The solvent may be any solvent that does not adversely affect the base material, that allows the resin to be dissolved or dispersed therein uniformly and stably, and that allows the inorganic filler to be dispersed therein uniformly and stably. Examples of the solvent (dispersion medium) include N-methylpyrrolidone, N,N-dimethylacetamide, N,N-dimethylformamide, acetone, and water.

The deposition solvent can be, for example, another solvent (hereinafter also referred to as "solvent X") that is dissolvable in the solvent (dispersion medium) contained in the coating solution and that does not dissolve the resin contained in the coating solution. The solvent (dispersion medium) can be efficiently removed from the coating solution by (i) immersing, in the solvent X, the base material to which the coating solution has been applied and on which a coating film has been formed, for replacing, with the solvent X, the solvent (dispersion medium) in the coating film on the base material or a support and then (ii) evaporating the solvent X. The deposition solvent is preferably isopropyl alcohol or t-butyl alcohol, for example.

For the process (3), the low-boiling-point organic acid can be, for example, paratoluene sulfonic acid or acetic acid.

In view of adhesiveness of the porous layer to an electrode (electrode sheet) and ion permeability of the porous layer, a coating amount (weight per unit area) of the porous layer (per single porous layer) is, typically, preferably 0.5 g/m$^2$ to 20 g/m$^2$, and more preferably 0.5 g/m$^2$ to 10 g/m$^2$, in terms of solid content. This means that an amount of the coating solution to be applied to the base material is preferably adjusted so that the porous layer to be produced will have a coating amount (weight per unit area) within the above range.

In any of the processes (1) to (3), changing the amount of resin for a porous layer which resin is to be dissolved or dispersed in a solution can adjust the volume of resin that is contained per square meter of a porous layer having undergone immersion in an electrolyte and that has absorbed the electrolyte.

Further, changing the amount of solvent in which the resin for the porous layer is to be dissolved or dispersed can adjust the porosity and average pore diameter of a porous layer having undergone immersion in an electrolyte.

Further, an orientation state of a porous layer in accordance with an embodiment of the present invention, that is, the above Formulae (1) and (2) can be controlled by regulating, as below, (i) a solid content concentration of a coating solution which is to be used in production of the porous layer and which contains the inorganic filler and the resin and (ii) a coating shear rate at the time when a base material is coated with the coating solution.

A suitable solid content concentration of the coating solution may vary depending on kinds of the inorganic filler, but generally, the solid content concentration is preferably higher than 20% by weight and not higher than 40% by weight. In a case where the solid content concentration is within the above range, the viscosity of the coating solution is kept appropriate. This consequently makes it possible to control each of the above Formulae (1) and (2) within the above preferred range. The solid content concentration in the above range is therefore preferable.

When the base material is coated with the coating solution, the coating shear rate may vary depending on kinds of the inorganic filler. Generally, the coating shear rate is preferably not lower than 2 (1/s) and more preferably in a range of 4 (1/s) to 50 (1/s).

For example, assume a case where the inorganic filler is made of a plate-shaped metal oxide such as a hexagonal plate-shaped zinc oxide. In this case, a higher shear force is applied to that metal oxide when the coating shear rate is higher. Then, the inorganic filler is anisotropically oriented, so that the value expressed by each of the above Formulae (1) and (2) is in a specific range. In contrast, a shear force is not applied to that metal oxide when the coating shear rate is lower. This causes the inorganic filler to be isotropically oriented, so that the value expressed by each of the above Formulae (1) and (2) is smaller than a specific range.

On the other hand, in a case where the inorganic filler is made of a long-fiber-diameter metal oxide, such as a long-fiber-diameter wollastonite, long fibers tangle with each other or long fibers are caught on a blade portion of a doctor blade when the coating shear rate is higher. This causes the inorganic filler to be randomly oriented, that is, to be anisotropically oriented, so that the value expressed by each of the above Formulae (1) and (2) is in a specific range. In contrast, long fibers do not tangle with each other or are not caught on a blade portion of a doctor blade when the coating shear rate is lower. This makes the inorganic filler to be easily oriented, so that the inorganic filler is isotropically oriented and the value expressed by each of the above Formulae (1) and (2) is larger than a specific range.

Embodiment 2: Nonaqueous Electrolyte Secondary Battery Laminated Separator

A nonaqueous electrolyte secondary battery laminated separator in accordance with Embodiment 2 of the present invention includes: a porous base material containing a polyolefin as a main component; and a nonaqueous electrolyte secondary battery insulating porous layer in accordance with Embodiment 1 of the present invention, the nonaqueous electrolyte secondary battery insulating porous layer being provided on one surface or both surfaces of the porous layer.

<Porous Base Material>

In the nonaqueous electrolyte secondary battery laminated separator in accordance with an embodiment of the present invention, the porous base material only needs to be a base material that (i) is porous and filmy, and (ii) contains a polyolefin as a main component (such a base material is also called a polyolefin-based porous base material). The porous base material is preferably a microporous film. Specifically, the porous base material is preferably a porous base material that (i) contains a polyolefin as a main component, (ii) has therein pores connected to one another and (iii) allows a gas and/or a liquid to pass therethrough from one surface to the other. The porous base material may include a single layer or a plurality of layers.

The porous base material typically contains a polyolefin component at a proportion of not less than 50% by volume, preferably not less than 90% by volume, and more preferably not less than 95% by volume, with respect to the whole of the porous base material. The polyolefin component of the porous base material preferably contains a high molecular weight component having a weight-average molecular weight of $5 \times 10^5$ to $15 \times 10^6$. In particular, the polyolefin component of the porous base material preferably has a weight-average molecular weight in a range of not less than 1,000,000. This is because such a polyolefin component imparts higher strength to the porous base material and to the whole of a nonaqueous electrolyte secondary battery laminated separator.

Examples of the polyolefin include high molecular weight homopolymers and high molecular weight copolymers which homopolymers and copolymers are each obtained by polymerizing ethylene, propylene, 1-butene, 4-methyl-1-pentene, 1-hexene, and/or the like. The porous base material can be a layer containing one of these polyolefins and/or a layer containing two or more of these polyolefins. In particular, a high molecular weight polyethylene which is mainly made of ethylene is preferable. Note that the porous base material can contain other component which is different from the polyolefin, provided that the other component does not impair a function of the porous base material.

The porous base material has an air permeability of typically 30 sec/100 cc to 500 sec/100 cc, and preferably 50 sec/100 cc to 300 sec/100 cc, in terms of Gurley values. In a case where the porous base material which has an air permeability within the above range is used as a constituent member of a nonaqueous electrolyte secondary battery laminated separator, the nonaqueous electrolyte secondary battery laminated separator can achieve sufficient ion permeability.

A film thickness of the porous base material is decided as appropriate in consideration of the number of layers in the nonaqueous electrolyte secondary battery laminated separator. Particularly in a case where the porous layer is formed on one surface (or both surfaces) of the porous base material, the porous base material has a film thickness of preferably 4 μm to 40 μm (per single porous layer), and more preferably 7 μm to 30 μm (per single porous layer).

A weight per unit area of the porous base material is typically 4 $g/m^2$ to 20 $g/m^2$ (per single porous layer), and preferably 5 $g/m^2$ to 12 $g/m^2$ (per single porous layer). This is because the porous base material which has such a weight per unit area makes it possible to increase not only strength, a film thickness, handleability, and a weight of the nonaqueous electrolyte secondary battery laminated separator but also a weight energy density and a volume energy density of a nonaqueous secondary battery separator in a case where the porous base material is used as a constituent member of the nonaqueous secondary battery separator.

Suitable examples of such a porous base material include a porous polyolefin layer disclosed in Japanese Patent Application Publication, Tokukai, No. 2013-14017, a polyolefin porous film disclosed in Japanese Patent Application Publication, Tokukai, No. 2012-54229, and a polyolefin base material porous film, and the like disclosed in Japanese Patent Application Publication, Tokukai, No. 2014-040580.

The porous base material may be produced by any publicly known technique, and is not particularly limited to any specific method. For example, as disclosed in Japanese Patent Application Publication, Tokukaihei, No. 7-29563 (1995), the porous base material may be produced by a method in which (i) a plasticizing agent is added to a thermoplastic resin to shape the thermoplastic resin into a film and then (ii) the plasticizing agent is removed with use of an appropriate solvent.

Specifically, in a case where, for example, the porous base material is produced from a polyolefin resin containing (i) an ultra-high molecular weight polyethylene and (ii) a low molecular weight polyolefin having a weight-average molecular weight of not greater than 10,000, the porous base material is, in terms of production costs, preferably produced by the method including the following steps (1) to (4):
(1) kneading (i) 100 parts by weight of a ultra-high molecular weight polyethylene, (ii) 5 parts by weight to 200 parts by weight of a low molecular weight polyolefin having a weight-average molecular weight of not greater than 10,000, and (iii) 100 parts by weight to 400 parts by weight of an inorganic filler, such as calcium carbonate, to obtain a polyolefin resin composition;
(2) shaping the polyolefin resin composition into a sheet;
(3) removing the inorganic filler from the sheet obtained in the step (2); and
(4) stretching the sheet obtained in the step (3).

Alternatively, the porous base material may be produced by any one of methods disclosed in the above-described Patent Literatures.

The porous base material may alternatively be a commercially available product having the above physical properties.

The porous base material is more preferably subjected to a hydrophilization treatment before the porous layer is formed on the porous base material, that is, before the porous base material is coated with the above coating solution. Subjecting the porous base material to the hydrophilization treatment further improves coatability of the porous base material with use of the coating solution, and accordingly allows the porous layer which is more uniform to be formed. This hydrophilization treatment is effective in a case where a solvent (dispersion medium) contained in the coating solution has a high proportion of water. Specific examples of the hydrophilization treatment include publicly known treatments such as (i) a chemical treatment involving an acid, an alkali, or the like, (ii) a corona treatment, and (iii) a plasma treatment. Among these hydrophilization treatments, the corona treatment is more preferable because the corona treatment makes it possible to not only hydrophilize the porous base material within a relatively short time period, but also hydrophilize only a surface and its vicinity of the porous base material to leave an inside of the porous base material unchanged in quality.

The porous base material may be arranged, as necessary, such that another porous layer other than the porous layer in accordance with Embodiment 1 of the present invention is formed on the porous base material. Examples of such another porous layer include publicly known porous layers such as a heat-resistant layer, an adhesive layer, and a protective layer. Specific examples of such another porous layer include a porous layer identical in composition to the porous layer in accordance with Embodiment 1 of the present invention.

<Method of Producing Nonaqueous Electrolyte Secondary Battery Laminated Separator>

The nonaqueous electrolyte secondary battery laminated separator in accordance with an embodiment of the present invention can be produced by, for example, a method in which the above porous base material is used as a base material to be coated with the coating solution in the above-described "Method of producing porous layer".

Embodiment 3: Nonaqueous Electrolyte Secondary Battery Member, and Embodiment 4: Nonaqueous Electrolyte Secondary Battery A nonaqueous electrolyte secondary battery member in accordance with Embodiment 3 of the present invention is obtained by arranging a positive electrode, a porous layer in accordance with Embodiment 1 of the present invention or a nonaqueous electrolyte secondary battery laminated separator in accordance with Embodiment 2 of the present invention, and a negative electrode, the positive electrode, the porous layer or the nonaqueous electrolyte secondary battery laminated separator, and the negative electrode being provided in this order.

A nonaqueous electrolyte secondary battery in accordance with Embodiment 4 of the present invention includes (i) a porous layer in accordance with Embodiment 1 of the present invention or (ii) a nonaqueous electrolyte secondary battery laminated separator in accordance with Embodiment 2 of the present invention.

The nonaqueous electrolyte secondary battery in accordance with an embodiment of the present invention is, for example, a nonaqueous secondary battery that achieves an electromotive force through doping with and dedoping of lithium, and is a lithium-ion secondary battery that includes a nonaqueous electrolyte secondary battery member including a positive electrode, a porous layer in accordance with an embodiment of the present invention, a porous base material, and a negative electrode, which are provided in this order, that is, a lithium-ion secondary battery that includes a positive electrode, a nonaqueous electrolyte secondary battery laminated separator in accordance with an embodiment of the present invention, and a negative electrode, which are provided in this order. Note that components of the nonaqueous electrolyte secondary battery other than the porous layer are not limited to those described below.

The nonaqueous electrolyte secondary battery in accordance with an embodiment of the present invention is typically arranged such that a battery element is enclosed in an exterior member, the battery element including (i) a structure in which the negative electrode and the positive electrode face each other via the porous layer in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery is preferably a secondary battery including a nonaqueous electrolyte, and is particularly preferably a lithium-ion secondary battery. Note that the doping means occlusion, support, adsorption, or insertion, and means a phenomenon in which lithium ions enter an active material of an electrode (e.g., a positive electrode).

The nonaqueous electrolyte secondary battery member in accordance with an embodiment of the present invention includes the porous layer in accordance with an embodiment of the present invention whose degree of orientation is suitably controlled. Accordingly, a nonaqueous electrolyte secondary battery incorporating the nonaqueous electrolyte secondary battery member can advantageously have a lower separator resistance. Further, since the nonaqueous electrolyte secondary battery in accordance with an embodiment of the present invention includes the porous layer in accordance with an embodiment of the present invention whose degree of orientation is suitably controlled, the nonaqueous electrolyte secondary battery advantageously has an excellent separator resistance.

<Positive Electrode>

A positive electrode included in the nonaqueous electrolyte secondary battery member in accordance with an embodiment of the present invention or in the nonaqueous electrolyte secondary battery in accordance with an embodiment of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer containing a positive electrode active material and a binder resin is formed on a current collector. The active material layer may further contain an electrically conductive agent and/or a binding agent.

The positive electrode active material is, for example, a material capable of being doped with and dedoped of lithium ions. Specific examples of such a material encompass a lithium complex oxide containing at least one transition metal such as V, Mn, Fe, Co, or Ni. Among such lithium complex oxides, (i) a lithium complex oxide having an $\alpha$-NaFeO$_2$ structure, such as lithium nickel oxide or lithium cobalt oxide, and (ii) a lithium complex oxide having a spinel structure, such as lithium manganese spinel, are preferable because such lithium complex oxides have a high average discharge potential. The lithium complex oxide may further contain any of various metal elements, and is more preferably a lithium nickel complex oxide.

Further, the lithium nickel complex oxide still more preferably contains at least one metal element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metal element and the number of moles of Ni in the lithium nickel oxide. This is because such a complex lithium nickel oxide leads to an excellent cycle characteristic when used in a high-capacity battery. Among others, an active material that contains Al or Mn and that further contains Ni at a proportion of not less than 85%, and more preferably not less than 90%, is particularly preferable. This is because when a positive electrode containing such an active material is used in a nonaqueous electrolyte secondary battery for use as a high-capacity battery, that nonaqueous electrolyte secondary battery has an excellent cycle characteristic.

Examples of the electrically conductive agent include carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination, for example, a mixture of artificial graphite and carbon black.

Examples of the binding agent encompass: thermoplastic resins such as polyvinylidene fluoride, a copolymer of vinylidene fluoride, polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, a thermoplastic polyimide, polyethylene, and polypropylene; acrylic resin; and styrene-butadiene-rubber. Note that the binding agent also functions as a thickener.

Examples of a method of preparing a positive electrode mix encompasses: a method in which pressure is applied to the positive electrode active material, the electrically conductive agent, and the binding agent on a positive electrode current collector; and a method in which an appropriate organic solvent is used so that the positive electrode active material, the electrically conductive material, and the binding agent will be in a paste form.

Examples of the positive electrode current collector encompass electric conductors such as Al, Ni, and stainless steel. Among these, Al is preferable because Al is easily processed into a thin film and is inexpensive.

The positive electrode sheet may be produced, that is, the positive electrode mix may be supported by the positive electrode current collector, by for example, a method in which pressure is applied to the positive electrode active material, the electrically conductive agent, and the binding agent on the positive electrode current collector to form a positive electrode mix thereon or a method in which (i) an appropriate organic solvent is used so that the positive electrode active material, the electrically conductive agent, and the binding agent will be in a paste form to provide a positive electrode mix, (ii) the positive electrode mix is applied to the positive electrode current collector, (iii) the applied positive electrode mix is dried so that a sheet-shaped positive electrode mix is prepared, and (iv) then pressure is applied to the sheet-shaped positive electrode mix so that the sheet-shaped positive electrode mix is firmly fixed to the positive electrode current collector.

<Negative Electrode>

A negative electrode included in the nonaqueous electrolyte secondary battery member in accordance with an embodiment of the present invention or in the nonaqueous electrolyte secondary battery in accordance with an embodiment of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer containing a negative electrode active material and a binder resin is formed on a current collector. The active material layer may further contain an electrically conductive agent and/or a binding agent.

Examples of the negative electrode active material encompass (i) a material capable of being doped with and dedoped of lithium ions, (ii) lithium metal, and (iii) lithium alloy. Specific examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide that are doped with and dedoped of lithium ions at an electric potential lower than that for the positive electrode; metals such as aluminum (Al), lead (Pb), tin (Sn), bismuth (Bi), or silicon (Si), each of which is alloyed with alkali metal; cubic intermetallic compounds (AlSb, $Mg_2Si$, and $NiSi_2$) having lattice spaces in which alkali metals can be provided; and lithium nitrogen compounds ($Li_3$-$xM_xN$ (where M represents a transition metal)). Among the above negative electrode active materials, a carbonaceous material that contains, as a main component, a graphite material such as natural graphite or artificial graphite is preferable. This is because such a carbonaceous material is high in potential evenness, and a great energy density can be obtained in a case where the carbonaceous material, which is low in average discharge potential, is combined with the positive electrode. The negative electrode active material may alternatively be a mixture of graphite and silicon, preferably containing Si at a proportion of not less than 5%, and more preferably not less than 10%, with respect to carbon (C) constituting the graphite.

The negative electrode mix may be prepared by, for example, a method in which pressure is applied to the negative electrode active material on a negative electrode current collector or a method in which an appropriate organic solvent is used so that the negative electrode active material will be in a paste form.

The negative electrode current collector is, for example, Cu, Ni, or stainless steel. Among these, Cu is preferable as it is not easily alloyed with lithium in the case of a lithium-ion secondary battery in particular and is easily processed into a thin film.

The negative electrode sheet may be produced, that is, the negative electrode mix may be supported by the negative electrode current collector by, for example, a method in which pressure is applied to the negative electrode active material on the negative electrode current collector to form a negative electrode mix thereon or a method in which (i) an appropriate organic solvent is used so that the negative electrode active material will be in a paste form to provide a negative electrode mix, (ii) the negative electrode mix is applied to the negative electrode current collector, (iii) the applied negative electrode mix is dried so that a sheet-shaped negative electrode mix is prepared, and (iv) then pressure is applied to the sheet-shaped negative electrode mix so that the sheet-shaped negative electrode mix is firmly fixed to the negative electrode current collector. The above paste preferably includes the above electrically conductive agent and the binding agent.

<Nonaqueous Electrolyte>

A nonaqueous electrolyte for use in the nonaqueous electrolyte secondary battery in accordance with an embodiment of the present invention is a nonaqueous electrolyte generally used in a nonaqueous electrolyte secondary battery, and is not limited to any particular one. Examples of the nonaqueous electrolyte include a nonaqueous electrolyte prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination. It is preferable to use, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte for an embodiment of the present invention include: carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methyl ether, 2,2,3,3-tetrafluoropropyl difluoro methyl ether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into any of the organic solvents described above. It is possible to use only one kind of the above organic solvents or two or more kinds of the above organic solvents in combination. Among the above organic solvents, carbonates are preferable. A mixed solvent of a cyclic carbonate and an acyclic carbonate or a mixed solvent of a cyclic carbonate and an ether is more preferable. The mixed solvent of a cyclic carbonate and an acyclic carbonate is still more preferably a mixed solvent of ethylene carbonate, dimethyl carbonate, and ethyl methyl carbonate. This is because such a mixed solvent leads to a wider operating temperature range, and is not easily decomposed even in a case where a negative electrode active material is a graphite material such as natural graphite or artificial graphite.

<Method of Producing Nonaqueous Electrolyte Secondary Battery Member and Method of Producing Nonaqueous Electrolyte Secondary Battery>

A nonaqueous electrolyte secondary battery member in accordance with an embodiment of the present invention can be produced by, for example, arranging a positive electrode, a porous layer in accordance with an embodiment of the present invention or a nonaqueous electrolyte secondary battery laminated separator in accordance with an embodiment of the present invention, and an negative electrode in this order.

A nonaqueous electrolyte secondary battery in accordance with an embodiment of the present invention can be produced by, for example, (i) producing a nonaqueous electrolyte secondary battery member as described above, (ii) inserting the nonaqueous electrolyte secondary battery member into a container that will serve as a housing of a nonaqueous electrolyte secondary battery, (iii) filling the container with a nonaqueous electrolyte, and (iv) hermetically sealing the container while reducing pressure inside the container.

The nonaqueous electrolyte secondary battery is not particularly limited in shape and may have any shape such as the shape of a thin plate (sheet), a disk, a cylinder, or a prism such as a cuboid. The nonaqueous electrolyte secondary battery member and the nonaqueous electrolyte secondary battery may each be produced by any method, and may each be produced by a conventionally publicly known method.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

EXAMPLES

The following description will discuss embodiments of the present invention in greater detail with reference to Examples and Comparative Examples. Note, however, that the present invention is not limited to the following Examples.

[Measurement]

In each of Examples and Comparative Examples below, the following methods were used to measure (i) a critical load value of a nonaqueous electrolyte secondary battery insulating porous layer, (ii) a ratio of a critical load distance in a transverse direction to a critical load distance in a machine direction (hereinafter, also referred to as a critical load distance T/M ratio) of the nonaqueous electrolyte secondary battery insulating porous layer, and (iii) a separator resistance of a nonaqueous electrolyte secondary battery.

(1. Scratch Test)

The critical load value and the critical load distance T/M ratio were measured by a scratch test described below. In this measurement, any conditions and the like for the measurement other than the conditions described below were similar to those disclosed in JIS R 3255. In addition, a measurement apparatus used in the scratch test was a microscratch testing device (manufactured by CSEM Instruments).

(1) A laminated porous film including a porous layer produced in each of Examples and Comparative Examples was cut into a piece of 20 mm×60 mm. Then, a preparation was made by combining the piece of the laminated porous film and a glass plate of 30 mm×70 mm with the use of glue which had been (i) obtained by 5-fold dilution of Arabic Yamato aqueous liquid glue (manufactured by YAMATO Co., Ltd.) with the use of water and (ii) thinly applied to an entire surface of the glass plate in an amount as small as a weight per unit area of approximately 1.5 g/m$^2$. Then, the preparation was dried at a temperature of 25° C. for one whole day and night, so that a test sample was prepared. Note that the piece of the laminated porous film and the glass plate were combined so that no air bubble would be made between the piece of the laminated porous film and the glass plate.

(2) The test sample prepared in the step (1) was placed on the microscratch testing device (manufactured by CSEM Instruments). Then, while a diamond indenter (in a conical shape having an apex angle of 120° and a tip radius of 0.2 mm) of the microscratch testing device was applying a vertical load of 0.1 N to the test sample, a table of the testing device was moved by a distance of 10 mm in a transverse direction (TD) of the laminated porous film at a speed of 5 mm/min. During the movement of the table, stress (force of friction) that occurred between the diamond indenter and the test sample was measured.

(3) A curve graph was made, which shows a relationship between a change in the stress measured in the step (2) and the distance of the movement of the table. Then, based on the curve graph, the following were calculated: (i) a critical load value in the TD and (ii) a distance (critical load distance) in the TD between a starting point of measurement and a point where the critical load is obtained.

(4) The direction of the movement of the table was changed to a machine direction (MD), and the above steps (1) to (3) were repeated. Then, the following were calculated: (i) a critical load value in the machine direction and (ii) the distance (critical load distance) in the machine direction between a starting point of measurement and a point where the critical load was obtained.

(2. Method of Measuring Separator Resistance)

The nonaqueous electrolyte secondary battery (produced in each of Examples 1 to 5 and Comparative Examples 1 to 5) was first subjected to four cycles of initial charge and discharge. Each of the four cycles of the initial charge and discharge was carried out at 25° C., at a voltage ranging from 4.1 V to 2.7 V, and at an electric current value of 0.2 C (note that 1 C is an electric current value at which a battery rated capacity derived from a one-hour rate discharge capacity is discharged in one hour, and this applies to the following descriptions).

Next, the alternating current impedance of the nonaqueous electrolyte secondary battery, which had been subjected to the four cycles of initial charge and discharge, was measured at a room temperature of 25° C. while a voltage amplitude of 10 mV was applied to the nonaqueous electrolyte secondary battery. The alternating current impedance here was measured with use of an LCR meter (product name: chemical impedance meter (type 3532-80)) manufactured by Hioki E.E. Corporation. The alternating current impedance at a frequency ranging 300000 Hz to 10 Hz was measured here. Then, a Nyquist plot was prepared and an X intercept was taken as a separator resistance value.

(3. BET Specific Surface Area of Inorganic Filler)

A BET specific surface area of an inorganic filler was measured by BELSORP-mini (manufactured by MicrotracBEL Corp.). In this measurement, after the inorganic filler had been pretreated by drying in a vacuum at a temperature of 80° C. for 8 hours by using an apparatus (described later) for pretreatment, the inorganic filler was subjected to measurement by a constant volume method, so that a nitrogen adsorption-desorption isotherm was obtained. Then, the BET specific surface area of the inorganic filler was calculated by a BET method. Various conditions of the measurement by the constant volume method were as follows: (i) adsorption temperature: 77K; (ii) adsorbate: nitrogen; (iii) saturated vapor pressure: actual measured value; (iv) adsorbate cross-sectional area: 0.162 $nm^2$; and (v) waiting time at equilibrium (a waiting time after an adsorption equilibrium state (a state in which a pressure change in adsorption and desorption becomes not greater than a predetermined value) is reached): 500 sec. Meanwhile, a pore volume of the inorganic filler was calculated by an MP method or a BJH method. As the apparatus for pretreatment, BELPREP-vacll (manufactured by MicrotracBEL Corp.) was used.

(4. Central Particle Diameter (D50) of Inorganic Filler)

A volume-based central particle diameter (D50) of the inorganic filler was measured with use of a laser diffraction particle size analyzer (manufactured by Shimadzu Corporation; product name: SALD2200). Here, the term "central particle diameter (D50)" means a particle diameter in a case where a volume-based cumulative distribution is 50%.

Example 1

[Preparation of Porous Layer and Laminated Porous Film]
(Porous Base Material (A Layer))

A porous base material was prepared by using polyethylene that is a polyolefin.

That is, 70 parts by weight of an ultra-high molecular weight polyethylene powder (340M, manufactured by Mitsui Chemicals, Inc.) and 30 parts by weight of a polyethylene wax (FNP-0115, manufactured by Nippon Seiro Co., Ltd.) having a weight-average molecular weight of 1,000 were mixed with each other so that a mixed polyethylene was prepared. Then, with respect to 100 parts by weight of the mixed polyethylene thus obtained, 0.4 parts by weight of an antioxidant (Irg1010, manufactured by Ciba Specialty Chemicals Corporation), 0.1 parts by weight of an antioxidant (P168, manufactured by Ciba Specialty Chemicals Corporation), and 1.3 parts by weight of sodium stearate were added. Then, calcium carbonate (manufactured by Maruo Calcium Co., Ltd.) having an average particle diameter of 0.1 μm was further added so that the calcium carbonate accounted for 38% by volume of the total volume. Then, the above composition in powder form was mixed by a Henschel mixer, and was then melt-kneaded by a twin screw kneading extruder. As a result, thus a polyethylene resin composition was obtained. Next, the polyethylene resin composition was rolled with use of a pair of rollers each having a surface temperature of 150° C., so that a sheet was produced. This sheet was immersed in an aqueous hydrochloric acid solution (in which 4 mol/L of hydrochloric acid and 0.5% by weight of nonionic surfactant were mixed), so that the calcium carbonate was dissolved into this solution and removed from the sheet. Subsequently, the sheet was stretched at 105° C. at a stretch ratio of 6 times, so that a porous base material (A layer) made of polyethylene was prepared. The porous base material had a porosity of 53%, a weight per unit area of 7 $g/m^2$, and a thickness of 16 μm.

(Porous Layer (B Layer))
(Preparation of Coating Solution)

As the inorganic filler, a hexagonal plate-shaped zinc oxide (manufactured by Sakai Chemical Industry Co., Ltd., product name: XZ-100F) (inorganic filler 1) was used. This hexagonal plate-shaped zinc oxide had an atomic mass percentage of oxygen of 20%.

As a binder resin, a vinylidene fluoride-hexafluoropropylene copolymer (manufactured by Arkema Inc.; product name "KYNAR2801") (binder resin 1) was used.

With respect to 90 parts by weight of the inorganic filler 1, 10 parts by weight of the binder resin 1 was mixed, and also, a solvent (N-methyl-2-pyrrolidinone (solvent 1), manufactured by Kanto Chemical Co., Inc.) was mixed with the inorganic filler 1 and the binder resin 1 so that a solid content concentration (concentration of the inorganic filler 1 and the binder resin 1) of a resultant mixed solution was 37% by weight. The resultant mixed solution was stirred and mixed by a thin-film spin system high-speed mixer (FILMIX (Registered Trademark), manufactured by PRIMIX Corporation), so that a uniform coating solution (coating solution 1) was obtained.

(Production of Porous Layer and Laminated Porous Film)

The coating solution 1 thus obtained was applied to one surface of the A layer by a doctor blade method at a coating shear rate of 3.9 (1/s), so that a coating film was formed on that one surface of the A layer. Thereafter, the coating film was dried at 65° C. for 20 minutes, so that a porous layer (B layer) was formed on the one surface of the A layer. As a result, a laminated porous film 1 in which the B layer was provided on the one surface of the A layer was obtained. The B layer had a weight per unit area of 7 $g/m^2$ and a thickness of 4 μm.

[Preparation of Nonaqueous Electrolyte Secondary Battery]

The following method was used for preparing a nonaqueous electrolyte secondary battery 1 by using the laminated porous film 1 thus obtained.

(Positive Electrode)

A commercially available positive electrode was used that was produced by applying $LiNi_{0.5}Mn_{0.3}Co_{0.2}O_2$/electrically conductive agent/PVDF (weight ratio 92:5:3) to an aluminum foil. The aluminum foil was partially cut off so that a positive electrode active material layer was present in an area of 45 mm×30 mm and that that area was surrounded by an area with a width of 13 mm in which area no positive electrode active material layer was present. The cutoff was used as a positive electrode. The positive electrode active material layer had a thickness of 58 μm and a density of 2.50 $g/cm^3$. The positive electrode had a capacity of 174 mAh/g.

(Negative Electrode)

A commercially available negative electrode was used that was produced by applying graphite styrene-1,3-butadiene copolymer/sodium/carboxymethylcellulose (weight ratio 98:1:1) to a copper foil. The copper foil was partially cut off so that a negative electrode active material layer was present in an area of 50 mm×35 mm and that that area was surrounded by an area with a width of 13 mm in which area no negative electrode active material layer was present. The cutoff was used as a negative electrode. The negative electrode active material layer had a thickness of 49 μm and a density of 1.40 $g/cm^3$. The negative electrode had a capacity of 372 mAh/g.

(Preparation of Nonaqueous Electrolyte Secondary Battery)

In a laminate pouch, the positive electrode, the laminated porous film 1 (nonaqueous electrolyte secondary battery laminated separator), and the negative electrode were disposed (arranged to form a laminate) in this order so as to obtain a nonaqueous electrolyte secondary battery member. During this operation, the positive electrode and the negative electrode were arranged so that the positive electrode active material layer of the positive electrode had a main surface that was entirely covered by the main surface of the negative electrode active material layer of the negative electrode.

Subsequently, the nonaqueous electrolyte secondary battery member was put into a bag made of a laminate of an aluminum layer and a heat seal layer. Further, 0.25 mL of nonaqueous electrolyte was put into the bag. The nonaqueous electrolyte was an electrolyte at 25° C. prepared by dissolving $LiPF_6$ in a mixed solvent of ethyl methyl carbonate, diethyl carbonate, and ethylene carbonate in a volume ratio of 50:20:30 so that the concentration of $LiPF_6$ in the electrolyte was 1.0 mole per liter. The bag was then heat-sealed while the pressure inside the bag was reduced. This produced a nonaqueous electrolyte secondary battery 1. The nonaqueous electrolyte secondary battery 1 had a design capacity of 20.5 mAh.

Example 2

[Preparation of Porous Layer and Laminated Porous Film]

Fused Zirkondioxid/Calciumoxid ($ZrO_2$/CaO=95/5) (manufactured by ceram BmGH) having an atomic mass percentage of oxygen of 26% was subjected to grounding for 4 hours by using an alumina pot having a capacity of 3.3 L and a 15 mmφ alumina ball in a vibrating mill. This produced an inorganic filler 2.

A laminated porous film 2 was prepared as in Example 1 except that (i) the inorganic filler used in Example 1 for preparation of the porous layer (B layer) was replaced by the inorganic filler 2 and (ii) the coating shear rate in Example 1 was changed to a coating shear rate of 7.9 (1/s).

[Preparation of Nonaqueous Electrolyte Secondary Battery]

Further, a nonaqueous electrolyte secondary battery 2 was prepared as in Example 1 except that the laminated porous film 2 was used in place of the laminated porous film 1.

Example 3

[Preparation of Porous Layer and Laminated Porous Film]

An inorganic filler 3 was obtained by mixing, in a mortar, 99 parts by weight of α-alumina (manufactured by Sumitomo Chemical Co., Ltd.; product name: AKP3000) and 1 part by weight of a hexagonal plate-shaped zinc oxide (manufactured by Sakai Chemical Industry Co., Ltd., product name: XZ-1000F). The inorganic filler 3 had an atomic mass percentage of oxygen of 47%.

Then, with respect to 90 parts by weight of the inorganic filler 3, 10 parts by weight of the binder resin 1 was mixed, and also, the solvent 1 was mixed so that a solid content concentration (concentration of the inorganic filler 3 and the binder resin 1) of a resultant mixed solution was 40% by weight. The resultant mixed solution was stirred and mixed by a thin-film spin system high-speed mixer, so that a uniform coating solution (coating solution 2) was obtained.

Subsequently, a laminated porous film 3 was prepared as in Example 1 except that (i) the coating solution 1 was replaced by the coating solution 2 and (ii) the coating shear rate in Example 1 was changed to a coating shear rate of 39.4 (1/s).

[Preparation of Nonaqueous Electrolyte Secondary Battery]

Further, a nonaqueous electrolyte secondary battery 3 was prepared as in Example 1 except that the laminated porous film 3 was used in place of the laminated porous film 1.

Example 4

[Preparation of Porous Layer and Laminated Porous Film]

An inorganic filler 4 was obtained by mixing, in a mortar, 50 parts by weight of a spherical alumina (manufactured by Sumitomo Chemical Co., Ltd.; product name: AA03) and 50 parts by weight of a synthetic mica (manufactured by Wako Pure Chemical Industries, Ltd.; product name: non-swelling synthetic mica). The inorganic filler 4 had an atomic mass percentage of oxygen of 27%.

Then, with respect to 90 parts by weight of the inorganic filler 4, 10 parts by weight of the binder resin 1 was mixed, and also, the solvent 1 was mixed so that a solid content concentration (concentration of the inorganic filler 4 and the binder resin 1) of a resultant mixed solution was 30% by weight. The resultant mixed solution was stirred and mixed by a thin-film spin system high-speed mixer, so that a uniform coating solution (coating solution 3) was obtained.

Subsequently, a laminated porous film 4 was prepared as in Example 1 except that (i) the coating solution 1 was replaced by the coating solution 3 and (ii) the coating shear rate in Example 1 was changed to a coating shear rate of 7.9 (1/s).

[Preparation of Nonaqueous Electrolyte Secondary Battery]

Further, a nonaqueous electrolyte secondary battery 4 was prepared as in Example 1 except that the laminated porous film 4 was used in place of the laminated porous film 1.

Example 5

[Preparation of Porous Layer and Laminated Porous Film]

As the inorganic filler, wollastonite (manufactured by Hayashi-Kasei Co., Ltd.; product name: wollastonite VM-8N) (inorganic filler 5) having an atomic mass percentage of oxygen of 42% was used.

Then, with respect to 90 parts by weight of the inorganic filler 5, 10 parts by weight of the binder resin 1 was mixed, and also, the solvent 1 was mixed so that a solid content concentration (concentration of the inorganic filler 5 and the binder resin 1) of a resultant mixed solution was 40% by weight. The resultant mixed solution was stirred and mixed by a thin-film spin system high-speed mixer, so that a uniform coating solution (coating solution 4) was obtained.

Subsequently, a laminated porous film 5 was prepared as in Example 1 except that (i) the coating solution 1 was replaced by the coating solution 4 and (ii) the coating shear rate in Example 1 was changed to a coating shear rate of 7.9 (1/s).

[Preparation of Nonaqueous Electrolyte Secondary Battery]

Further, a nonaqueous electrolyte secondary battery 5 was prepared as in Example 1 except that the laminated porous film 5 was used in place of the laminated porous film 1.

Comparative Example 1

[Preparation of Porous Layer and Laminated Porous Film]

As the inorganic filler, borax (manufactured by Wako Pure Chemical Industries, Ltd.) having an atomic mass percentage of oxygen of 71% was used (inorganic filler 6).

Then, with respect to 90 parts by weight of the inorganic filler 6, 10 parts by weight of the binder resin 1 was mixed, and also, the solvent 1 was mixed so that a solid content concentration (concentration of the inorganic filler 6 and the binder resin 1) of a resultant mixed solution was 40% by weight. The resultant mixed solution was stirred and mixed by a thin-film spin system high-speed mixer, so that a uniform coating solution (coating solution 5) was obtained.

Subsequently, a laminated porous film 6 was prepared as in Example 1 except that (i) the coating solution 1 was replaced by the coating solution 5 and (ii) the coating shear rate in Example 1 was changed to a coating shear rate of 7.9 (1/s).

[Preparation of Nonaqueous Electrolyte Secondary Battery]

Further, a nonaqueous electrolyte secondary battery 6 was prepared as in Example 1 except that the laminated porous film 6 was used in place of the laminated porous film 1.

Comparative Example 2

[Preparation of Porous Layer and Laminated Porous Film]

As the inorganic filler, synthetic mica (manufactured by Wako Pure Chemical Industries, Ltd., product name: non-swelling mica) having an atomic mass percentage of oxygen of 44% was used (inorganic filler 7).

Then, with respect to 90 parts by weight of the inorganic filler 7, 10 parts by weight of the binder resin 1 was mixed, and also, the solvent 1 was mixed so that a solid content concentration (concentration of the inorganic filler 7 and the binder resin 1) of a resultant mixed solution was 20% by weight. The resultant mixed solution was stirred and mixed by a thin-film spin system high-speed mixer, so that a uniform coating solution (coating solution 6) was obtained.

Subsequently, a laminated porous film 7 was prepared as in Example 1 except that (i) the coating solution 1 was replaced by the coating solution 6 and (ii) the coating shear rate in Example 1 was changed to a coating shear rate of 0.4 (1/s).

[Preparation of Nonaqueous Electrolyte Secondary Battery]

Further, a nonaqueous electrolyte secondary battery 7 was prepared as in Example 1 except that the laminated porous film 7 was used in place of the laminated porous film 1.

Comparative Example 3

[Preparation of Porous Layer and Laminated Porous Film]

As the inorganic filler, a spherical alumina (manufactured by Sumitomo Chemical Co., Ltd.; product name: AA03) having an atomic mass percentage of oxygen of 47% was used (inorganic filler 8).

Then, with respect to 90 parts by weight of the inorganic filler 8, 10 parts by weight of the binder resin 1 was mixed, and also, the solvent 1 was mixed so that a solid content concentration (concentration of the inorganic filler 8 and the binder resin 1) of a resultant mixed solution was 40% by weight. The resultant mixed solution was stirred and mixed by a thin-film spin system high-speed mixer, so that a uniform coating solution (coating solution 7) was obtained.

Subsequently, a laminated porous film 8 was prepared as in Example 1 except that (i) the coating solution 1 was replaced by the coating solution 7 and (ii) the coating shear rate in Example 1 was changed to a coating shear rate of 7.9 (1/s).

[Preparation of Nonaqueous Electrolyte Secondary Battery]

Further, a nonaqueous electrolyte secondary battery 8 was prepared as in Example 1 except that the laminated porous film 8 was used in place of the laminated porous film 1.

Comparative Example 4

[Preparation of Porous Layer and Laminated Porous Film]

As the inorganic filler, wollastonite (manufactured by Hayashi-Kasei Co., Ltd.; product name: wollastonite VM-8N) having an atomic mass percentage of oxygen of 41% was used (inorganic filler 9).

Then, with respect to 90 parts by weight of the inorganic filler 9, 10 parts by weight of the binder resin 1 was mixed, and also, the solvent 1 was mixed so that a solid content concentration (concentration of the inorganic filler 9 and the binder resin 1) of a resultant mixed solution was 40% by weight. The resultant mixed solution was stirred and mixed by a thin-film spin system high-speed mixer, so that a uniform coating solution (coating solution 8) was obtained.

Subsequently, a laminated porous film 9 was prepared as in Example 1 except that (i) the coating solution 1 was replaced by the coating solution 8 and (ii) the coating shear rate in Example 1 was changed to a coating shear rate of 0.8 (1/s).

[Preparation of Nonaqueous Electrolyte Secondary Battery]

Further, a nonaqueous electrolyte secondary battery 9 was prepared as in Example 1 except that the laminated porous film 9 was used in place of the laminated porous film 1.

Comparative Example 5

As the inorganic filler, fumed silica (manufactured by NIPPON AEROSIL CO., LTD.; product name: AEROSIL 200) having an atomic mass percentage of oxygen of 53% was used (inorganic filler 10).

Then, with respect to 90 parts by weight of the inorganic filler 10, 10 parts by weight of the binder resin 1 was mixed, and also, the solvent 1 was mixed so that a solid content concentration (concentration of the inorganic filler 10 and the binder resin 1) of a resultant mixed solution was 40% by weight. The resultant mixed solution was stirred and mixed by a thin-film spin system high-speed mixer, so that a uniform coating solution (coating solution 9) was obtained.

Subsequently, a laminated porous film 10 was prepared as in Example 1 except that (i) the coating solution 1 was replaced by the coating solution 9 and (ii) the coating shear rate in Example 1 was changed to a coating shear rate of 7.9 (1/s).

[Preparation of Nonaqueous Electrolyte Secondary Battery]

Further, a nonaqueous electrolyte secondary battery 10 was prepared as in Example 1 except that the laminated porous film 10 was used in place of the laminated porous film 1.

[Measurement Results]

The above-described scratch test was carried out by using each of the laminated porous films 1 to 10 obtained in Examples 1 to 5 and Comparative Examples 1 to 5, respectively, and a "critical load" and a "distance (critical load distance) between a starting point of measurement and a point (critical point) where the critical load was obtained" were measured in the TD and in the MD. Table 1 shows results of the measurement in Examples 1 to 5 and Table 2 shows results of the measurement in Comparative Examples 1 to 5.

Note that in Tables 1 and 2, the "Filler" indicates the "inorganic filler" used in each of Examples 1 to 5 and Comparative Examples 1 to 5. Further, in regard to each of Examples 2 to 4, two kinds of compounds and a numerical value are written in the "Filler" column. This numerical value indicates respective parts by weight of the compounds. For example, the description "$ZrO_2/CaO$ 95/5" in the case of Example 2 indicates that 95 parts by weight of $ZrO_2$ and 5 parts by weight of CaO were used.

other words, the above demonstrated that the porous layer in accordance with an embodiment of the present invention makes it possible to reduce a separator resistance of a nonaqueous electrolyte secondary battery in a case where the porous layer is provided in the nonaqueous electrolyte secondary battery.

INDUSTRIAL APPLICABILITY

A porous layer in accordance with an embodiment of the present invention can be suitably used in production of a nonaqueous electrolyte secondary battery excellent in separator resistance. Therefore, a laminated body, a nonaqueous electrolyte secondary battery separator, an electrode for a nonaqueous electrolyte secondary battery, and a nonaqueous

TABLE 1

| | Filler | Scratch Direction | Critical Load [N] | Critical Load Distance [mm] | $\|1 - T/M\|$ | Central Particle Diameter $D = 50$ [μm] | BET Specific Surface Area [m$^2$/g] | Separator Resistance [Ω] |
|---|---|---|---|---|---|---|---|---|
| Example 1 | ZnO | MD | 0.23 | 3.25 | 0.10 | 0.4 | 7.3 | 0.40 |
| | | TD | 0.21 | 2.93 | | | | |
| Example 2 | $ZrO_2$/CaO 95/5 | MD | 0.24 | 4.07 | 0.18 | 1.2 | 4.0 | 0.39 |
| | | TD | 0.22 | 3.35 | | | | |
| Example 3 | $Al_2O_3$/ZnO 99/1 | MD | 0.22 | 3.85 | 0.21 | 0.8 | 4.5 | 0.43 |
| | | TD | 0.20 | 3.06 | | | | |
| Example 4 | $Al_2O_3$/Mica 50/50 | MD | 0.23 | 3.45 | 0.29 | 4.2 | 4.5 | 0.37 |
| | | TD | 0.20 | 2.46 | | | | |
| Example 5 | Wollastonite | MD | 0.22 | 4.03 | 0.40 | 10.6 | 1.3 | 0.48 |
| | | TD | 0.20 | 2.42 | | | | |

TABLE 2

| | Filler | Scratch Direction | Critical Load [N] | Critical Load Distance [mm] | $\|1 - T/M\|$ | Central Particle Diameter $D = 50$ [μm] | BET Specific Surface Area [m$^2$/g] | Separator Resistance [Ω] |
|---|---|---|---|---|---|---|---|---|
| Comparative Example 1 | Borax | MD | 0.24 | 3.06 | 0.43 | 27.0 | 2.5 | 0.54 |
| | | TD | 0.20 | 1.73 | | | | |
| Comparative Example 2 | Mica | MD | 0.20 | 3.97 | 0.47 | 5.5 | 3.2 | 0.91 |
| | | TD | 0.19 | 2.10 | | | | |
| Comparative Example 3 | $Al_2O_3$ | MD | 0.22 | 3.02 | 0.02 | 0.6 | 5.7 | 0.51 |
| | | TD | 0.19 | 2.95 | | | | |
| Comparative Example 4 | Wollastonite | MD | 0.23 | 3.98 | 0.43 | 10.6 | 1.3 | 0.75 |
| | | TD | 0.21 | 2.25 | | | | |
| Comparative Example 5 | Fumed silica | MD | 0.22 | 3.55 | 0.41 | 0.02 | 110 | 0.68 |
| | | TD | 0.20 | 2.10 | | | | |

CONCLUSION

It is clear from Tables 1 and 2 that the separator resistance is better in the nonaqueous electrolyte secondary batteries obtained in Examples 1 to 5 each including a porous layer in accordance with an embodiment of the present invention, which porous layer has (i) a central particle diameter of the inorganic filler in a range of 0.1 μm to 11 μm; (ii) a BET specific surface area per unit area of the inorganic filler in a range of not greater than 100 m$^2$/g; and (iii) a value of $|1-T/M|$ in a range of 0.10 to 0.40, than in the nonaqueous electrolyte secondary batteries obtained in Comparative Examples 1 to 5 each including a porous layer (i) whose central particle diameter of the inorganic filler is outside the above range, (ii) whose BET specific surface area per unit area of the inorganic filler is outside the above range and/or (iii) whose value of $|1-T/M|$ is outside the above range. In electrolyte secondary battery member each in accordance with an embodiment of the present invention can be widely used in the field of production of nonaqueous electrolyte secondary batteries.

REFERENCE SIGNS LIST 1 diamond indenter
2 substrate
3 porous film containing polyolefin as main component

The invention claimed is:
1. A nonaqueous electrolyte secondary battery insulating porous layer comprising an inorganic filler and a resin, wherein:
a central particle diameter of the inorganic filler is in a range of 0.1 μm to 11 μm;

a BET specific surface area of the inorganic filler is not greater than 100 m²/g;

a weight per unit area of the inorganic filler and the resin is 0.5 g/m² to 20 g/m²; and a value expressed by the following formula (1) is in a range of 0.10 to 0.40, the value being an index indicative of the orientation of the inorganic filler:

$$|1-T/M| \quad (1),$$

wherein T and M are obtained in a scratch test comprising moving a test sample of the nonaqueous electrolyte secondary battery insulating porous layer a distance of 10 mm in a transverse direction of the porous layer at a speed of 5 mm/min while applying a vertical load of 0.1 N to the test sample, and then moving the test sample of the nonaqueous electrolyte secondary battery insulating porous layer a distance of 10 mm in a machine direction of the porous layer at a speed of 5 mm/min while applying a vertical load of 0.1 N, where where T represents a distance by which the porous layer moves in the transverse direction from a starting point of measurement to a point where a critical load is obtained in the scratch test until a constant load of 0.1 N and M represents a distance by which the porous layer moves in the machine direction from a starting point of measurement to a point where a critical load is obtained in the scratch test under the constant load of 0.1 N, wherein the nonaqueous electrolyte secondary battery insulating porous layer is formed by applying a coating solution containing the inorganic filler and the resin along a single direction to form the porous layer, wherein the transverse direction is the single direction and the machine direction is a direction perpendicular to the transverse direction.

2. The nonaqueous electrolyte secondary battery insulating porous layer according to claim 1, wherein:

a value expressed by the following formula (2) is in a range of 0.10 to 0.40, the value being an index indicative of the orientation of the inorganic filler:

$$1-T/M \quad (2).$$

3. The nonaqueous electrolyte secondary battery insulating porous layer according to claim 1, wherein:

the inorganic filler contains alumina and a plate-shaped filler.

4. A nonaqueous electrolyte secondary battery laminated separator comprising:

a porous base material containing a polyolefin as a main component; and a nonaqueous electrolyte secondary battery insulating porous layer recited in claim 1, the nonaqueous electrolyte secondary battery insulating porous layer being provided on one surface or both surfaces of the porous base material.

5. A nonaqueous electrolyte secondary battery member comprising:

a positive electrode;

a nonaqueous electrolyte secondary battery laminated separator recited in claim 4; and a negative electrode, the positive electrode, the nonaqueous electrolyte secondary battery laminated separator, and the negative electrode being provided in this order.

6. A nonaqueous electrolyte secondary battery comprising:

a positive electrode, an electrolyte, the nonaqueous electrolyte secondary battery laminated separator recited in claim 4, and a negative electrode.

7. A nonaqueous electrolyte secondary battery member comprising:

a positive electrode;

a nonaqueous electrolyte secondary battery insulating porous layer recited in claim 1; and a negative electrode, the positive electrode, the nonaqueous electrolyte secondary battery insulating porous layer, and the negative electrode being provided in this order.

8. A nonaqueous electrolyte secondary battery comprising:

a positive electrode, an electrolyte, the nonaqueous electrolyte secondary battery insulating porous layer recited in claim 1, and a negative electrode.

9. The nonaqueous electrolyte secondary battery insulating porous layer according to claim 1, wherein:

the resin is at least one resin selected from the group consisting of aromatic polyamides and wholly aromatic polyamides.

* * * * *